United States Patent [19]

Nakatsuji

[11] Patent Number: 5,309,284
[45] Date of Patent: May 3, 1994

[54] GREAT RELATIVE APERTURE TELEPHOTO ZOOM LENS

[75] Inventor: Masahiro Nakatsuji, Kawasaki, Japan

[73] Assignee: Nikon Corporation, Tokyo, Japan

[21] Appl. No.: 11,763

[22] Filed: Feb. 1, 1993

[30] Foreign Application Priority Data

Feb. 5, 1992 [JP] Japan .................. 4-20073

[51] Int. Cl.$^5$ .......................................... G02B 15/14
[52] U.S. Cl. .................................................. 359/687
[58] Field of Search ........................................ 359/687

[56] References Cited

U.S. PATENT DOCUMENTS

| | | | |
|---|---|---|---|
| 4,105,291 | 8/1978 | Tsuji | 359/687 |
| 4,451,124 | 5/1984 | Basista | 359/687 |
| 4,693,566 | 9/1987 | Imaizumi | 359/687 |
| 5,191,476 | 3/1993 | Sato | 359/687 |

Primary Examiner—Edward K. Look
Assistant Examiner—Michael S. Lee
Attorney, Agent, or Firm—Shapiro and Shapiro

[57] ABSTRACT

A great relative aperture telephoto zoom lens of four-unit construction has, in succession from the object side, a first lens unit having positive refractive power, a second lens unit having negative refractive power, a third lens unit having positive refractive power, and a fourth lens unit having positive refractive power. The fourth lens unit has, in succession from the object side, a front group having positive refractive power and a rear group having positive refractive power. The front group has, in succession from the object side, two positive lens components and a negative lens component. The rear group has, in succession from the object side, a positive lens component and a negative lens component, and is designed to satisfy predetermined conditions.

4 Claims, 4 Drawing Sheets

GREAT RELATIVE APERTURE TELEPHOTO ZOOM LENS

BACKGROUND OF THE INVENTION

1. Field of the Invention

This invention relates to a zoom lens of four-unit construction.

2. Related Background Art

A telephoto zoom lens of four-unit construction comprising, in succession from the object side, a focusing lens unit having positive refractive power, a variably power lens unit having negative refractive power, a correcting lens unit having positive refractive power and a relay lens unit having positive refractive power has heretofore been put into practical use.

So, in conventional telephoto zoom lenses of four-unit construction as described above, when attention is paid to the fourth lens unit as the relay lens unit, many such zoom lenses have a structure in which the exit pupil is located beyond the image plane.

Therefore, when the principal ray of a maximum angle of view passes through that lens surface in the fourth lens unit which is most adjacent to the image plane, the emergence height of the principal ray has become great, and to secure the quantity of marginal light, it has been necessary to make the effective diameter of the lens surface which is most adjacent to the image plane great.

Also, in a zoom lens of the internal focusing type based on the conventional zoom lens of four-unit construction as described above, the full length has become great to secure the movable portion of the focusing lens unit and the height at which the principal ray of a maximum angle of view passes through the lens has become small and therefore, it has been impossible to secure the quantity of marginal light sufficiently. As a result, it has been necessary to make the effective diameter of that lens in the first lens unit which is located most adjacent to the object side great.

SUMMARY OF THE INVENTION

It is the object of the present invention to eliminate the above-noted disadvantages peculiar to the conventional zoom lenses and to provide a great relative aperture telephoto zoom lens having an excellent imaging performance over the entire zooming range.

To achieve the above object, a great relative aperture telephoto zoom lens according to the present invention is a zoom lens of four-unit construction comprising, in succession from the object side, a first lens unit having positive refractive power, a second lens unit having negative refractive power, a third lens unit having positive refractive power and a fourth lens unit having positive refractive power, the fourth lens unit comprising, in succession from the object side, a front group having positive refractive power and a rear group having positive refractive power.

The front group has, in succession from the object side, a first positive meniscus lens, a second positive meniscus lens and a negative meniscus lens, and the rear group has, in succession from the object side, a biconvex positive lens and a negative meniscus lens having its convex surface facing the image side, and further, satisfies the following conditions:

$$1.5 < f_4/(D_{41} \cdot F_n) < 3.0 \quad (1)$$

$$3.1 < D_{41}/D_{42} < 4.8 \quad (2)$$

$$-3.7 < q_{43} < -1.2 \quad (3)$$

where $f_4$: the focal length of the fourth lens unit;

$F_n$: F number of the entire system;

$D_{41}$: the air gap from the image side lens surface of that lens component in the front group in the fourth lens unit which is most adjacent to the image side to the object side lens surface of that lens component in the rear group in the fourth lens unit which is most adjacent to the object side;

$D_{42}$: the air gap from the image side lens surface of that lens component in the rear group in the fourth lens unit which is most adjacent to the object side to the object side lens surface of that lens component in the rear group in the fourth lens unit which is most adjacent to the image side;

$q_{43}$: the shape factor of the negative lens component in the front group in the fourth lens unit, it being to be understood that when the radius of curvature of the object side lens surface is ra and the radius of curvature of the image side lens surface is rb, the shape factor q is defined by $q = (rb + ra)/(rb - ra)$.

In the present invention of the construction as described above, the back focal length of the fourth lens unit is made relatively long and the exit pupil is disposed at a position near the image plane and therefore, a sufficient quantity of marginal light can be secured even if the effective diameter of the lens which is most adjacent to the image plane is not enlarged.

Also, the present invention adopts the internal focusing type in which a lens component in the first lens unit is moved to effect focusing.

In a four-unit zoom lens of the internal focusing type, when the effective diameter of the lens which is most adjacent to the object side is of the same degree of size as in the prior art, that light beam of the light beam entering the lens which is below the principal ray decreases greatly.

However, if a construction is adopted in which the full length of the lens system of the fourth lens unit is made shorter than that in the prior art and a proper lens spacing is assumed, the light beam above the principal ray can be increased. Accordingly, by the light beam above the principal ray being increased in compensation for the decrease in the light beam below the principal ray, a sufficient quantity of marginal light can be secured as a whole without a great load being exerted on the optical system.

Also, if the construction of the fourth lens unit like that of the present invention as described above is used in any other conventional focusing type than the internal focusing type, the quantity of marginal light as a whole can be secured by an increase in the light beam below the principal ray, and yet if an aperture stop is disposed in the fourth lens unit, it will become easy to make the diameter of the stop small.

The above-mentioned conditional expressions will hereinafter be described.

Conditional expression (1) prescribes a proper lens spacing for the brightness of the lens by dividing the ratio of the air gap $D_{41}$ from the image side lens surface of that lens component in the front group in the fourth lens unit which is most adjacent to the image side to the object side lens surface of that lens component in the rear group in the fourth lens unit which is most adjacent to the object side to the refractive power (1/f₄) of the fourth lens unit as the relay lens unit by the F number (F$_n$) of the entire system, in other words, the F number of the fourth lens unit.

If the upper limit of conditional expression (1) is exceeded, the height of a ray leaving the on-axis object point from the optical axis will increase in the positive lens component in the rear group in the fourth lens unit which is most adjacent to the object side and therefore, negative spherical aberration will occur and further, the fluctuation of coma will become great, and this is not preferable. If conversely, the lower limit of conditional expression (1) is exceeded, the back focal length of the fourth lens unit relative to the full length of the lens system will become short and to secure the quantity of marginal light, the effective diameter of that lens component in the fourth lens unit which is located most adjacent to the image plane side will have to be enlarged, and this is not preferable.

Conditional expression (2) prescribes a proper ratio between the air gap D$_{41}$ from the image side lens surface of that lens component in the front group in the fourth lens unit which is most adjacent to the image side to the object side lens surface of that lens component in the rear group in the fourth lens unit which is most adjacent to the object side and the air gap D$_{42}$ from the image side lens surface of that lens component in the rear group in the fourth lens unit which is most adjacent to the object side to the object side lens surface of that lens component in the rear group in the fourth lens unit which is most adjacent to the image side.

If the upper limit of conditional expression (2) is exceeded, Petzval sum will become excessively positive and therefore, astigmatism will tend to become negative and curvature of image field will occur. The air gap D$_{41}$ will increase to thereby cause a decrease in the quantity of marginal light, and this is not preferable. If conversely, the lower limit of conditional expression (2) is exceeded, the height of the ray leaving the on-axis object point from the optical axis will increase in the positive lens component in the rear group in the fourth lens unit which is most adjacent to the object side and therefore, negative spherical aberration will occur. Also, the incidence height of the principal ray passing through said positive lens component at a maximum angle of view relative to the optical axis will decrease. Therefore, the correction of chromatic difference of magnification in the fourth lens unit in the negative direction will become difficult and as a result, chromatic difference of magnification will become excessive in the positive direction, and this is not preferable.

Conditional expression (3) represents the shape factor of the nagative lens component in the front group in the fourth lens unit. If the upper limit of conditional expression (3) is exceeded, the bending of g line of spherical aberration and astigmatism will become excessive in the positive direction as compared with that of d line and the fluctuation of coma by color will become great, and this is not preferable. If conversely, the lower limit of conditional expression (3) is exceeded, spherical aberration and on-axis chromatic aberration will both become under-corrected, and this is not preferable.

In the construction of the present invention as described above, the first lens unit has, in succession from the object side, a fixed first positive lens group having positive refractive power, a focusing second positive lens group having positive refractive power and a fixed negative lens group having negative refractive power, and it is desirable that the following conditions be further satisfied:

$$0.26 < f_4/(f_1 \cdot F_n) < 0.30 \quad (4)$$

$$1.0 < |f_4/(f_2 \cdot F_n)| < 1.3 \quad (5)$$

$$0.34 < f_4/(f_3 \cdot F_n) < 0.42 \quad (6)$$

$$0.01 < D_{12}/f_1 < 0.20 \quad (7)$$

$$0.5 < f_{11}/f_1 < 1.6 \quad (8)$$

where
f$_1$: the focal length of the first lens unit G1;
f$_2$: the focal length of the second lens unit G2;
f$_3$: the focal length of the third lens unit G3;
f$_4$: the focal length of the fourth lens unit G4;
Fn: F number of the entire system;
D$_{12}$: the air gap between the first positive lens group and the second positive lens group in the first lens unit in the infinity state;
f$_{11}$: the focal length of the first positive lens group in the first lens unit.

Conditional expressions (4)–(8) will hereinafter be described.

Conditional expressions (4), (5) and (6) represent the ratios of the refractive powers of the respective lens groups in the magnification changing lens system to the refractive power (1/f₄) of the fourth lens unit as the relay lens unit. By dividing these ratios by the F number (F$_n$) of the entire system, these conditional expressions prescribe the refractive power distributions of the respective groups in the magnification changing lens system relative to brightness. If the upper limits of conditional expressions (4), (5) and (6) are exceeded, the optical system will become too bright and the correction of various aberrations will become difficult. Also, the focal length of the fourth lens unit will become great and therefore, the full length of the lens system of the fourth lens unit will become great. Accordingly, when an attempt is made to make the fourth lens unit compact, it will become difficult to correct aberrations. If conversely, the lower limits of conditional expressions (4), (5) and (6) are exceeded, the optical system will become dark, and this is against the object of the present invention. Also, the focal length of the fourth lens unit will become shorter than necessary, and when the principal ray at a maximum angle of view is incident on that lens surface of the first lens unit which is most adjacent to the object side, the incidence height thereof will become greatly off the optical axis. Accordingly, to secure a sufficient quantity of marginal light, the effective diameter of that lens in the first lens unit which is located most adjacent to the object side will have to be enlarged.

Conditional expression (7) prescribes the relation between the focal length f$_1$ of the first lens unit and the air gap D$_{12}$ between the first positive lens group in the first lens unit in the infinity state and the second positive lens group in the first lens unit.

If the upper limit of conditional expression (7) is exceeded, the incidence height of the principal ray onto the lens surface which is most adjacent to the object side will become lower than the optical axis and an increase in the lens diameter of the first positive lens group in the first lens unit will result in order to secure the quantity of marginal light. Also, during focusing, the fluctuations of various aberrations, particularly, the fluctuations of astigmatism, etc. will become great and therefore, a good imaging performance will not be obtained. If conversely, the lower limit of conditional expression (7) is exceeded, the amount of movement of the second positive lens group in the first lens unit during focusing cannot be secured sufficinetly and the closest distance will become long, and this is inappropriate. Also, the refractive power of each lens group in the first lens unit will become strong and the fluctuations of aberrations, particularly, the fluctuation of spherical aberration will become great and therefore, the correction of aberrations will become difficult.

Conditional expression (8) prescribes the refractive power distribution of the focal length $f_1$ of the first lens unit and the focal length $f_{11}$ of the first positive lens group in the first lens unit.

If the upper limit of conditional expression (8) is exceeded, a proper refractive power distribution in the first lens unit will be destroyed and it will become difficult to provide well-balanced correction of various aberrations. In addition, the refractive power of the first positive lens group in the first lens unit will become relatively weak in the first lens unit and therefore, the degree of convergence of the ray flux passing through said first positive lens group will weaken, and the lens diameter of each lens group located more adjacent to the image side than said first positive lens group, particularly, the lens diameter of the second positive lens group in the first lens unit will become great. Therefore, the amount of work by focusing will become great, and this is inappropriate. If conversely, the lower limit of conditional expression (8) is exceeded, the refractive power of the first positive lens group in the first lens unit will become relatively strong in the first lens unit and therefore, high-order spherical aberration and chromatic difference of magnification will occur and the correction of aberrations will become difficult, and this is not desirable.

DESCRIPTION OF THE PREFERRED EMBODIMENTS

The construction of some embodiments of the present invention will hereinafter be described in greater detail with reference to the drawings.

FIGS. 1 to 5 show the lens constructions of first to fifth embodiments.

In succession from the object side, a first lens unit G1 is comprised of a first positive lens group G11 comprising a single positive lens component L11, a second positive lens group G12 comprising a negative lens L12 having its convex surface facing the object side and a positive lens component L13 cemented thereto and having its surface of sharper curvature facing the object side, and a negative lens group G13 comprising a negative lens component L14 having its convex surface facing the object side, a second lens unit G2 comprises a biconcave negative lens component L21, a biconcave negative lens component L22, a positive lens component L23 cemented thereto and a negative lens component L24, a third lens unit G3 comprises a positive lens component L31, a biconvex positive lens component L32 and a negative lens component L33 cemented thereto, and a fourth lens unit G4 is comprised of a front group G4F comprising a positive lens component L41 having its surface of sharper curvature facing the object side, a positive lens component L42 having its surface of sharper curvature facing the object side, and a negative lens component L43 having its convex surface facing the object side, and a rear group G4R comprising a positive lens component L44 and a negative lens component L45 having its convex surface facing the image side.

A stop S is provided between the third lens unit G3 and the fourth lens unit G4.

Figure 1:
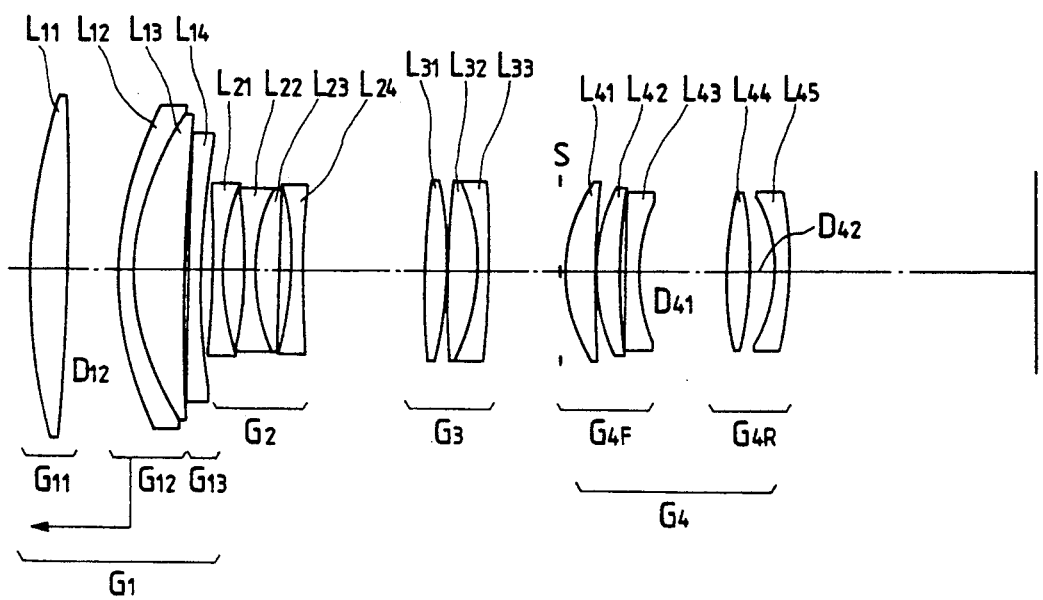
FIG. 1 shows the lens construction of a first embodiment of the zoom lens according to the present invention.
Figure 2:
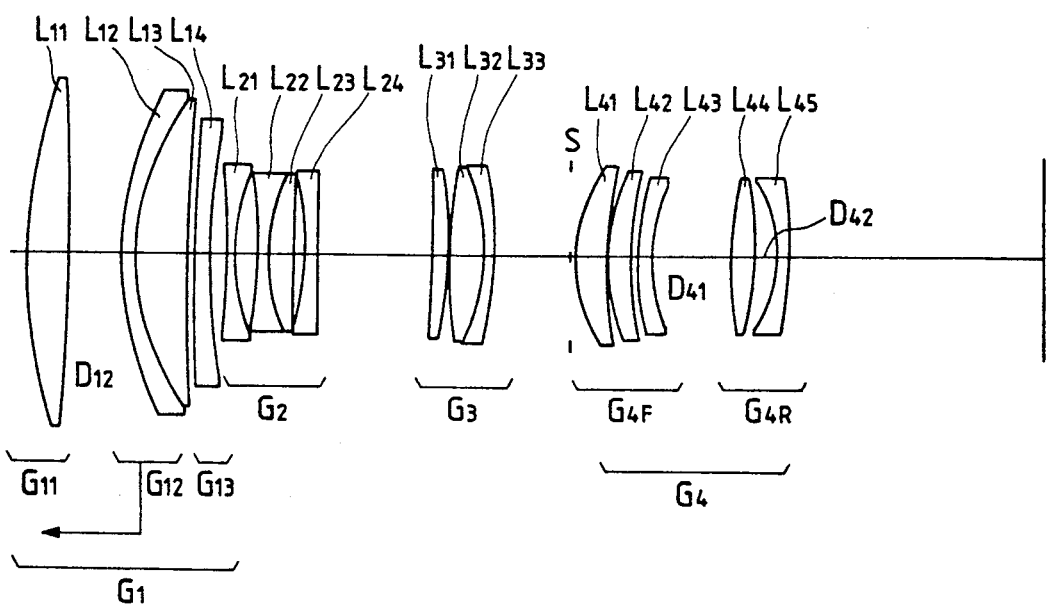
FIG. 2 shows the lens construction of a second embodiment of the zoom lens according to the present invention.
Figure 3:
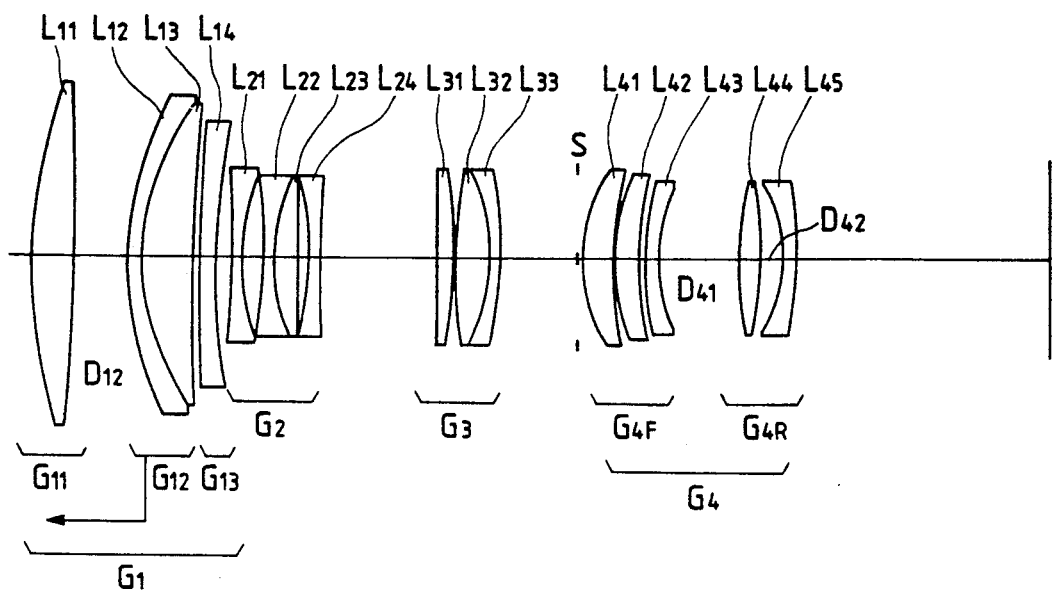
FIG. 3 shows the lens construction of a third embodiment of the zoom lens according to the present invention.
Figure 4:
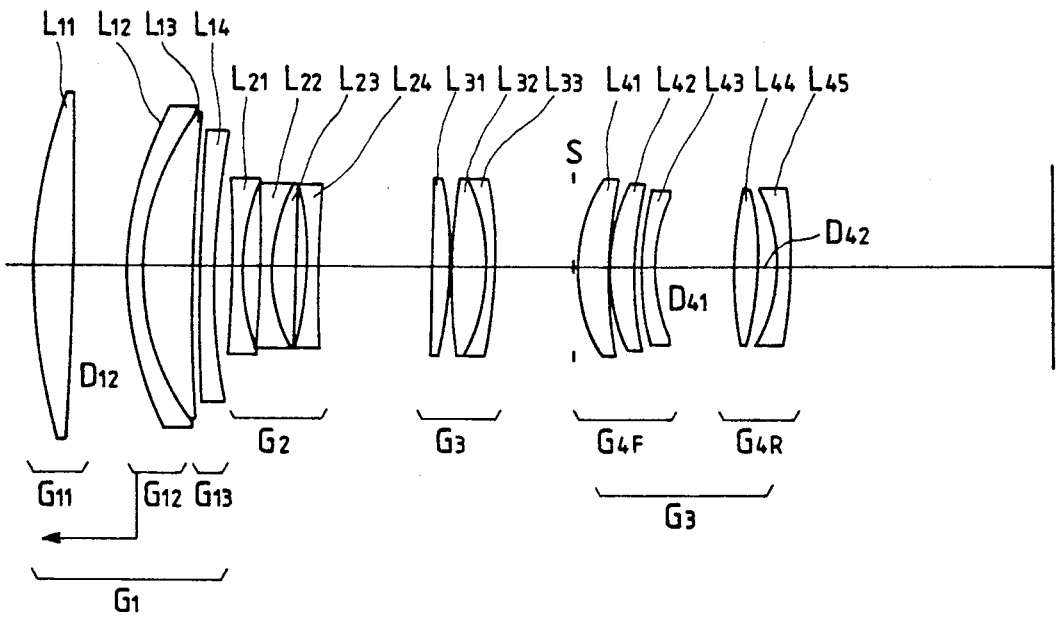
FIG. 4 shows the lens construction of a fourth embodiment of the zoom lens according to the present invention.
Figure 5:
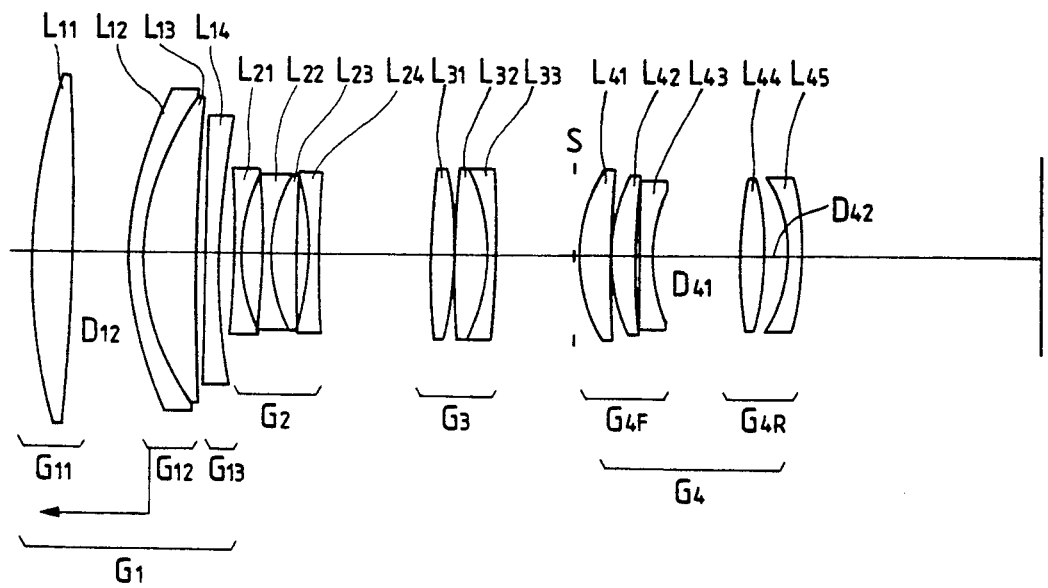
FIG. 5 shows the lens construction of a fifth embodiment of the zoom lens according to the present invention.
Figure 6:
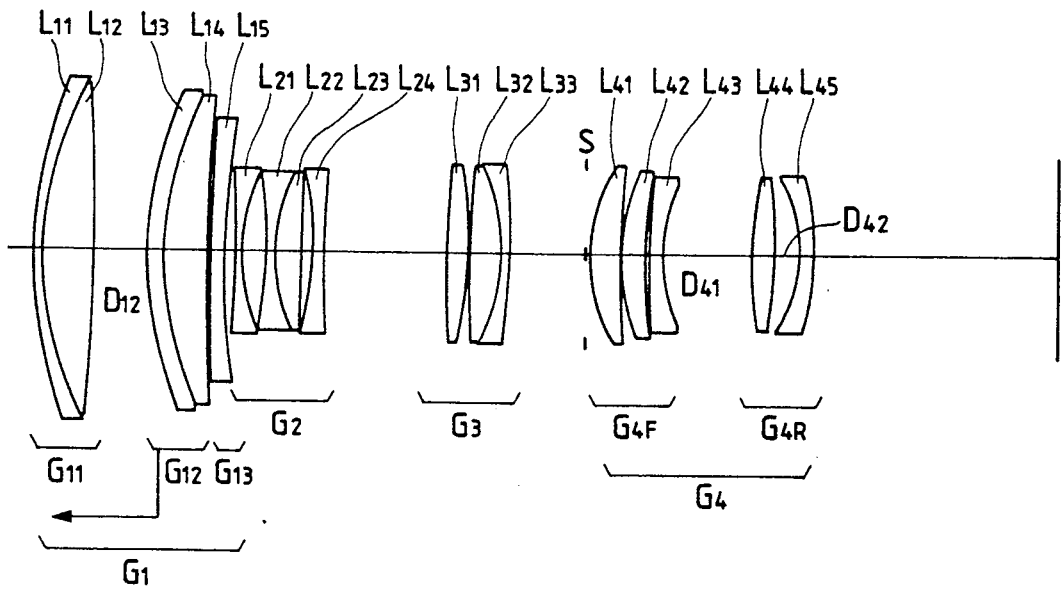
FIG. 6 shows the lens construction of a sixth embodiment of the zoom lens according to the present invention.
Figure 7:
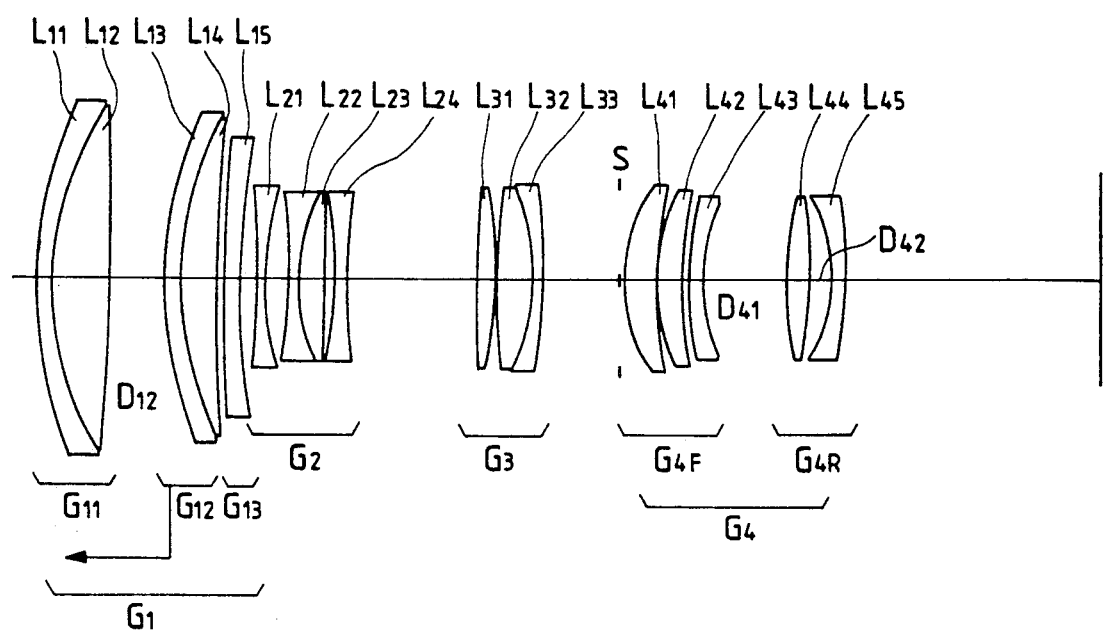
FIG. 7 shows the lens construction of a seventh embodiment of the zoom lens according to the present invention.

FIGS. 6 and 7 show the lens constructions of a sixth embodiment and a seventh embodiment.

In succession from the object side, a first lens unit G1 is comprised of a first positive lens group G11 comprising a negative lens component L11 having its convex surface facing the object side and a positive lens component L12 cemented thereto and having its surface of sharper curvature facing the object side, a second positive lens group G12 comprising a negative lens component L13 having its convex surface facing the object side and a positive lens component L14 cemented thereto and having its surface of sharper curvature facing the object side, and a negative lens group G13 comprising a negative lens component L15 having its convex surface facing the object side. Except the first lens unit G1, the lens constructions of the sixth and seventh embodiments are substantially similar to the lens constructions of the first to fifth embodiments.

The numerical data of the first to seventh embodiments of the present invention will be shown in Tables 1 to 7 below. In these tables, the numbers at the left end represent the order from the object side, r represents the radii of curvature of respective lens surfaces, d represents the spacing between adjacent lens surfaces, and refractive indices n and Abbe numbers v are values for d line ($\lambda = 587.6$ nm). Also, f represents the focal length, Fn represents F number, and $2\omega$ represents the angle of view.

TABLE 1

(First Embodiment)
f = 82.0~196.0
$F_n$ = 2.88
$2\omega$ = 30.26°~12.28°

| | r | d | v | n |
|---|---|---|---|---|
| 1 | 120.657 | 8.50 | 82.6 | 1.49782 |
| 2 | −554.205 | (d2 = variable) | | |
| 3 | 72.341 | 3.50 | 25.5 | 2.80458 |
| 4 | 54.342 | 11.50 | 82.6 | 1.49782 |

TABLE 1-continued (First Embodiment)
f = 82.0~196.0
$F_n$ = 2.88
2ω = 30.26°~12.28°

|    | r        | d              | v    | n       |
|----|----------|----------------|------|---------|
| 5  | 551.732  | (d5 = variable)|      |         |
| 6  | 710.722  | 3.00           | 45.9 | 1.54814 |
| 7  | 168.916  | (d7 = variable)|      |         |
| 8  | −213.443 | 2.00           | 60.8 | 1.56384 |
| 9  | 46.868   | 5.00           |      |         |
| 10 | −102.959 | 2.00           | 60.0 | 1.64000 |
| 11 | 39.173   | 5.60           | 26.1 | 1.78470 |
| 12 | 4071.027 | 2.50           |      |         |
| 13 | −78.039  | 2.50           | 60.0 | 1.64000 |
| 14 | 255.373  | (d14 = variable)|     |         |
| 15 | 141.217  | 5.00           | 60.3 | 1.51835 |
| 16 | −86.876  | .20            |      |         |
| 17 | 248.806  | 7.00           | 60.8 | 1.56384 |
| 18 | −44.214  | 2.30           | 31.7 | 1.75692 |
| 19 | −185.331 | (d19 = variable)|     |         |
| 20 | 33.918   | 7.00           | 82.6 | 1.49782 |
| 21 | 321.251  | .20            |      |         |
| 22 | 41.811   | 5.00           | 64.1 | 1.51680 |
| 23 | 132.311  | 1.00           |      |         |
| 24 | 373.718  | 3.00           | 33.9 | 1.80384 |
| 25 | 37.137   | 19.22          |      |         |
| 26 | 72.857   | 5.50           | 33.8 | 1.64831 |
| 27 | −67.772  | 5.26           |      |         |
| 28 | −31.710  | 3.00           | 45.4 | 1.79668 |
| 29 | −84.533  | (d29 = variable)|     |         |

The variable spacings in the first embodiment at the infinity distance are as follows:

| F   | 82.0000 | 196.0000 |
|-----|---------|----------|
| D0  | ∞       | ∞        |
| d2  | 1.0637  | 11.0637  |
| d5  | .6383   | .6383    |
| d7  | 2.7881  | 39.4226  |
| d14 | 26.5587 | 2.8671   |
| d19 | 17.2143 | 4.2714   |
| d29 | 54.4445 | 54.4445  |

The variable spacings in the first embodiment at the close distance are as follows:

| β   | −.0542   | −.1295   |
|-----|----------|----------|
| D0  | 1577.5133| 1577.5133|
| d2  | 1.2131   | 1.2131   |
| d5  | 10.4889  | 10.4889  |
| d7  | 2.7881   | 39.4226  |
| d14 | 26.5587  | 2.8671   |
| d19 | 17.2143  | 4.2714   |
| d29 | 54.4445  | 54.4445  |

The condition-corresponding numerical values of the first embodiment are as follows:

(1) $f_4/(D_{41} \cdot F_n) = 1.870$
(2) $D_{41}/D_{42} = 3.654$
(3) $q_{43} = -1.221$
(4) $f_4/(F_1 \cdot F_n) = 0.284$
(5) $|f_4/(f_2 \cdot F_n)| = 1.097$
(6) $f_4/(f_3 \cdot F_n) = 0.413$
(7) $D_{12}/f_1 = 0.087$
(8) $f_{11}/f_1 = 1.580$

TABLE 2

(Second Embodiment)
f = 82.0~196.0
$F_n$ = 2.88
2ω = 30.31°~12.32°

|    | r         | d              | v    | n       |
|----|-----------|----------------|------|---------|
| 1  | 117.268   | 9.00           | 82.6 | 1.49782 |
| 2  | −643.622  | (d2 = variable)|      |         |
| 3  | 71.219    | 3.30           | 25.5 | 1.80458 |
| 4  | 53.757    | 11.70          | 82.6 | 1.49782 |
| 5  | 491.514   | (d5 = variable)|      |         |
| 6  | 745.764   | 3.40           | 45.9 | 1.54814 |
| 7  | 159.019   | (d7 = variable)|      |         |
| 8  | −230.640  | 2.00           | 60.0 | 1.64000 |
| 9  | 47.918    | 5.20           |      |         |
| 10 | −105.257  | 2.00           | 60.0 | 1.64000 |
| 11 | 40.244    | 5.60           | 26.1 | 1.78470 |
| 12 | −1287.518 | 2.50           |      |         |
| 13 | −70.164   | 2.50           | 60.0 | 1.64000 |
| 14 | 413.078   | (d14 = variable)|     |         |
| 15 | .000      | 3.80           | 60.3 | 1.51835 |
| 16 | −104.401  | .20            |      |         |
| 17 | 121.691   | 7.80           | 60.3 | 1.51835 |
| 18 | −42.048   | 2.30           | 25.5 | 1.80458 |
| 19 | −87.164   | (d19 = variable)|     |         |
| 20 | 33.945    | 7.00           | 82.6 | 1.49782 |
| 21 | 97.350    | .20            |      |         |
| 22 | 48.499    | 5.00           | 59.7 | 1.53996 |
| 23 | 75.978    | 1.50           |      |         |
| 24 | 66.019    | 3.00           | 25.5 | 1.80458 |
| 25 | 37.366    | 17.30          |      |         |
| 26 | 67.118    | 5.70           | 35.6 | 1.62588 |
| 27 | −70.087   | 4.46           |      |         |
| 28 | −31.519   | 3.00           | 45.4 | 1.79668 |
| 29 | −97.559   | (d29 = variable)|     |         |

The variable spacings in the second embodiment at the infinity distance are as follows:

| F   | 82.0000 | 196.0000 |
|-----|---------|----------|
| D0  | ∞       | ∞        |
| d2  | 11.5139 | 11.5139  |
| d5  | 1.6984  | 1.6984   |
| d7  | 3.6412  | 40.2998  |
| d14 | 25.2971 | 2.5552   |
| d19 | 18.0721 | 4.1555   |
| d29 | 55.6961 | 55.6961  |

The variable spacings in the second embodiment at the close distance are as follows:

| β   | −.0543   | −.1297   |
|-----|----------|----------|
| D0  | 1575.6208| 1575.6208|
| d2  | 1.6178   | 1.6178   |
| d5  | 11.5946  | 11.5946  |
| d7  | 3.6412   | 40.2998  |
| d14 | 25.2971  | 2.5552   |
| d19 | 18.0721  | 4.1555   |
| d29 | 55.6961  | 55.6961  |

The condition-corresponding numerical values of the second embodiment are as follows:

(1) $f_4/(D_{41} \cdot F_n) = 2.078$
(2) $D_{41}/D_{42} = 3.878$
(3) $q_{43} = -3.608$
(4) $f_4/(f_1 \cdot F_n) = 0.266$
(5) $|f_4/(f_2 \cdot F_n)| = 1.120$
(6) $f_4/(f_3 \cdot F_n) = 0.413$
(7) $D_{12}/f_1 = 0.085$
(8) $f_{11}/f_1 = 1.479$

TABLE 3

(Third Embodiment)
f = 82.0~196.0
$F_n = 2.88$
$2\omega = 30.28° \sim 12.30°$

| | r | d | ν | n |
|---|---|---|---|---|
| 1 | 117.844 | 9.00 | 82.6 | 1.49782 |
| 2 | −626.477 | (d2 = variable) | | |
| 3 | 71.341 | 3.30 | 25.5 | 1.80458 |
| 4 | 53.845 | 11.70 | 82.6 | 1.49782 |
| 5 | 496.989 | (d5 = variable) | | |
| 6 | 776.214 | 3.40 | 45.9 | 1.54814 |
| 7 | 160.373 | (d7 = variable) | | |
| 8 | −230.819 | 2.00 | 60.0 | 1.64000 |
| 9 | 47.716 | 5.20 | | |
| 10 | −103.789 | 2.00 | 60.0 | 1.64000 |
| 11 | 41.122 | 5.60 | 26.1 | 1.78470 |
| 12 | −1618.243 | 2.50 | | |
| 13 | −69.912 | 2.50 | 60.0 | 1.64000 |
| 14 | 533.755 | (d14 = variable) | | |
| 15 | .000 | 3.80 | 60.3 | 1.51835 |
| 16 | −105.011 | .20 | | |
| 17 | 120.951 | 7.80 | 60.3 | 1.51835 |
| 18 | −42.049 | 2.30 | 25.5 | 1.80458 |
| 19 | −87.139 | (d19 = variable) | | |
| 20 | 33.950 | 7.00 | 82.6 | 1.49782 |
| 21 | 96.663 | .20 | | |
| 22 | 48.492 | 5.00 | 59.7 | 1.53996 |
| 23 | 75.627 | 1.50 | | |
| 24 | 66.027 | 3.00 | 25.5 | 1.80458 |
| 25 | 37.614 | 17.60 | | |
| 26 | 66.518 | 5.50 | 35.6 | 1.62588 |
| 27 | −70.641 | 4.45 | | |
| 28 | −31.553 | 3.00 | 45.4 | 1.79668 |
| 29 | −98.825 | (d29 = variable) | | |

The variable spacings in the third embodiment at the infinity distance are as follows:

| F | 82.0000 | 196.0000 |
|---|---|---|
| D0 | ∞ | ∞ |
| d2 | 11.5124 | 11.5124 |
| d5 | 1.7464 | 1.7464 |
| d7 | 3.6885 | 40.3470 |
| d14 | 25.2046 | 2.4627 |
| d19 | 18.0534 | 4.1368 |
| d29 | 55.5654 | 55.5654 |

The variable spacings in the third embodiment at close distance are as follows:

| β | −.0543 | −.1297 |
|---|---|---|
| D0 | 1575.6756 | 1575.6756 |
| d2 | 1.6168 | 1.6168 |
| d5 | 11.6421 | 11.6421 |
| d7 | 3.6885 | 40.3470 |
| d14 | 25.2046 | 2.4627 |
| d19 | 18.0534 | 4.1368 |
| d29 | 55.5654 | 55.5654 |

The condition-corresponding numerical values of the third embodiment are as follows:

(1) $f_4/(D_{41} \cdot F_n) = 2.042$
(2) $D_{41}/D_{42} = 3.952$
(3) $q_{43} = -3.648$
(4) $f_4/(f_1 \cdot F_n) = 0.266$
(5) $|f_4/(f_2 \cdot F_n)| = 1.120$
(6) $f_4/(f_3 \cdot F_n) = 0.413$
(7) $D_{12}/f_1 = 0.085$
(8) $f_{11}/f_1 = 1.479$

TABLE 4

(Fourth Embodiment)
f = 82.0~196.0
$F_n = 2.88$
$2\omega = 30.28° \sim 12.30°$

| | r | d | ν | n |
|---|---|---|---|---|
| 1 | 116.691 | 9.00 | 82.6 | 1.49782 |
| 2 | −661.977 | (d2 = variable) | | |
| 3 | 70.631 | 3.30 | 25.5 | 1.80458 |
| 4 | 53.071 | 11.70 | 82.6 | 1.49782 |
| 5 | 479.717 | (d5 = variable) | | |
| 6 | 698.465 | 3.40 | 45.9 | 1.54814 |
| 7 | 156.736 | (d7 = variable) | | |
| 8 | −217.110 | 2.00 | 60.3 | 1.62041 |
| 9 | 44.656 | 4.30 | | |
| 10 | −168.354 | 2.00 | 58.5 | 1.65160 |
| 11 | 36.750 | 5.60 | 25.5 | 1.80458 |
| 12 | 803.759 | 2.40 | | |
| 13 | −64.233 | 2.70 | 53.8 | 1.69350 |
| 14 | 1198.177 | (d14 = variable) | | |
| 15 | .000 | 3.80 | 60.3 | 1.51835 |
| 16 | −95.162 | .20 | | |
| 17 | 124.565 | 7.80 | 60.3 | 1.51835 |
| 18 | −43.834 | 2.30 | 25.5 | 1.80458 |
| 19 | −91.709 | (d19 = variable) | | |
| 20 | 35.812 | 7.00 | 82.6 | 1.49782 |
| 21 | 100.998 | .20 | | |
| 22 | 43.073 | 5.00 | 59.7 | 1.53996 |
| 23 | 70.176 | 1.50 | | |
| 24 | 61.484 | 3.00 | 25.5 | 1.80458 |
| 25 | 33.838 | 17.30 | | |
| 26 | 72.257 | 5.70 | 35.6 | 1.62588 |
| 27 | −60.146 | 3.84 | | |
| 28 | −33.527 | 3.00 | 45.1 | 1.74400 |
| 29 | −118.845 | (d29 = variable) | | |

The variable spacings in the fourth embodiment at the infinity distance are as follows:

| F | 82.0000 | 196.0000 |
|---|---|---|
| D0 | ∞ | ∞ |
| d2 | 11.5679 | 11.5679 |
| d5 | 1.5840 | 1.5840 |
| d7 | 3.8628 | 40.5209 |
| d14 | 24.6582 | 1.9164 |
| d19 | 18.3837 | 4.4674 |
| d29 | 57.4630 | 57.4630 |

The variable spacings in the fourth embodiment at the close distance are as follows:

| β | −.0543 | −.1297 |
|---|---|---|
| D0 | 1575.4371 | 1575.4372 |
| d2 | 1.6706 | 1.6706 |
| d5 | 11.4814 | 11.4813 |
| d7 | 3.8628 | 40.5209 |
| d14 | 24.6582 | 1.9164 |
| d19 | 18.3837 | 4.4674 |
| d29 | 57.4630 | 57.4630 |

The condition-corresponding numerical values of the fourth embodiment are as follows:

(1) $f_4/(D_{41} \cdot F_n) = 2.042$
(2) $D_{41}/D_{42} = 4.501$
(3) $q_{43} = -3.448$
(4) $f_4/(f_1 \cdot F_n) = 0.274$
(5) $|f_4/(f_2 \cdot F_n)| = 1.100$
(6) $f_4/(f_3 \cdot F_n) = 0.413$
(7) $D_{12}/f_1 = 0.090$
(8) $f_{11}/f_1 = 1.554$

TABLE 5

(Fifth Embodiment)
f = 82.0~196.0
$F_n = 2.88$
$2\omega = 29.88° \sim 12.20°$

| | r | d | ν | n |
|---|---|---|---|---|
| 1 | 125.391 | 9.00 | 82.6 | 1.49782 |
| 2 | −472.380 | (d2 = variable) | | |
| 3 | 71.307 | 3.30 | 25.5 | 1.80458 |
| 4 | 54.092 | 11.70 | 82.6 | 1.49782 |
| 5 | 481.016 | (d5 = variable) | | |
| 6 | 1070.937 | 3.40 | 45.9 | 1.54814 |
| 7 | 170.132 | (d7 = variable) | | |
| 8 | −263.017 | 2.00 | 60.3 | 1.62041 |
| 9 | 39.683 | 4.30 | | |
| 10 | −146.617 | 2.00 | 59.7 | 1.53996 |
| 11 | 36.456 | 5.60 | 25.5 | 1.80458 |
| 12 | 471.680 | 2.40 | | |
| 13 | −62.547 | 2.70 | 53.8 | 1.69350 |
| 14 | 427.030 | (d14 = variable) | | |
| 15 | 185.077 | 5.00 | 60.3 | 1.51835 |
| 16 | −75.070 | .20 | | |
| 17 | 254.444 | 7.00 | 60.8 | 1.56384 |
| 18 | −42.868 | 2.30 | 31.7 | 1.75692 |
| 19 | −169.008 | (d19 = variable) | | |
| 20 | 32.814 | 7.00 | 82.6 | 1.49782 |
| 21 | 286.137 | .20 | | |
| 22 | 39.757 | 5.00 | 64.1 | 1.51680 |
| 23 | 120.996 | 1.00 | | |
| 24 | 381.229 | 3.00 | 33.9 | 1.80384 |
| 25 | 35.741 | 19.22 | | |
| 26 | 77.382 | 5.50 | 33.8 | 1.64831 |
| 27 | −65.426 | 5.26 | | |
| 28 | −30.402 | 3.00 | 45.4 | 1.79668 |
| 29 | −66.961 | (d29 = variable) | | |

The variable spacings in the fifth embodiment at the infinity distance are as follows:

| F | 82.0000 | 196.0000 |
|---|---|---|
| D0 | ∞ | ∞ |
| d2 | 11.8758 | 11.8758 |
| d5 | 1.8529 | 1.8529 |
| d7 | 3.4861 | 40.0663 |
| d14 | 24.3188 | 1.6965 |
| d19 | 18.2359 | 4.2779 |
| d29 | 53.0234 | 53.0234 |

The variable spacings in the fifth embodiment at the close distance are as follows:

| β | −.0542 | −.1295 |
|---|---|---|
| D0 | 1577.1280 | 1577.1280 |
| d2 | 1.9916 | 1.9916 |
| d5 | 11.7372 | 11.7372 |
| d7 | 3.4861 | 40.0663 |
| d14 | 24.3188 | 1.6965 |
| d19 | 18.2359 | 4.2779 |
| d29 | 53.0234 | 53.0234 |

The condition-corresponding numerical values of the fifth embodiment are as follows:

(1) $f_4/(D_{41} \cdot F_n) = 1.763$
(2) $D_{41}/D_{42} = 3.654$
(3) $q_{43} = -1.207$
(4) $f_4/(f_1 \cdot F_n) = 0.263$
(5) $|f_4/(f_2 \cdot F_n)| = 1.055$
(6) $f_4/(f_3 \cdot F_n) = 0.399$
(7) $D_{12}/f_1 = 0.092$
(8) $f_{11}/f_1 = 1.554$

TABLE 6

(Sixth Embodiment)
f = 82.0~196.0
$F_n = 2.88$
$2\omega = 30.28° \sim 12.28°$

| | r | d | ν | n |
|---|---|---|---|---|
| 1 | 99.869 | 2.00 | 28.6 | 1.79504 |
| 2 | 75.701 | 11.00 | 82.6 | 1.49782 |
| 3 | −491.834 | (d3 = variable) | | |
| 4 | 79.943 | 3.50 | 25.5 | 1.80458 |
| 5 | 71.402 | 10.00 | 82.6 | 1.49782 |
| 6 | 427.132 | (d6 = variable) | | |
| 7 | 454.516 | 3.00 | 55.6 | 1.69680 |
| 8 | 175.947 | (d8 = variable) | | |
| 9 | −333.681 | 2.00 | 60.8 | 1.56384 |
| 10 | 47.073 | 5.00 | | |
| 11 | −94.026 | 2.00 | 60.0 | 1.64000 |
| 12 | 40.612 | 5.60 | 26.1 | 1.78470 |
| 13 | −2194.651 | 2.50 | | |
| 14 | −70.512 | 2.50 | 60.0 | 1.64000 |
| 15 | 228.020 | (d15 = variable) | | |
| 16 | 178.994 | 5.00 | 60.3 | 1.51835 |
| 17 | −98.312 | .20 | | |
| 18 | 234.812 | 7.00 | 60.8 | 1.56384 |
| 19 | −42.140 | 2.30 | 31.7 | 1.75692 |
| 20 | −132.926 | (d20 = variable) | | |
| 21 | 34.737 | 7.00 | 82.6 | 1.49782 |
| 22 | 271.303 | .20 | | |
| 23 | 46.041 | 5.00 | 60.8 | 1.56384 |
| 24 | 109.813 | 1.00 | | |
| 25 | 163.061 | 3.00 | 31.7 | 1.75692 |
| 26 | 36.707 | 19.22 | | |
| 27 | 73.355 | 5.50 | 35.5 | 1.59507 |
| 28 | −90.783 | 5.26 | | |
| 29 | −30.751 | 3.00 | 45.4 | 1.79668 |
| 30 | −60.914 | (d30 = variable) | | |

The variable spacings in the sixth embodiment at the infinity distance are as follows:

| F | 82.0000 | 196.0000 |
|---|---|---|
| D0 | ∞ | ∞ |
| d3 | 11.6920 | 11.6920 |
| d6 | .9461 | .9461 |
| d8 | 2.2927 | 38.3507 |
| d15 | 26.6315 | 3.2057 |
| d20 | 17.8890 | 5.2568 |
| d30 | 54.0985 | 54.0985 |

The variable spacings in the sixth embodiment at the close distance are as follows:

| β | −.0543 | −.1297 |
|---|---|---|
| D0 | 1573.6711 | 1573.6711 |
| d3 | 1.6208 | 1.6208 |
| d6 | 11.0172 | 11.0172 |
| d8 | 2.2927 | 38.3507 |
| d15 | 26.6315 | 3.2057 |
| d20 | 17.8890 | 5.2568 |
| d30 | 54.0985 | 54.0985 |

The condition-corresponding numerical values of the sixth embodiment are as follows:

(1) $f_4/(D_{41} \cdot F_n) = 1.870$
(2) $D_{41}/D_{42} = 3.654$
(3) $q_{43} = -1.581$
(4) $f_4/(f_1 \cdot F_n) = 0.272$
(5) $|f_4/(f_2 \cdot F_n)| = 1.112$
(6) $f_4/(f_3 \cdot F_n) = 0.413$
(7) $D_{12}/f_1 = 0.088$
(8) $f_{11}/f_1 = 1.500$

TABLE 7

(Seventh Embodiment)
$f = 82.0 \sim 196.0$
$F_n = 2.88$
$2\omega = 30.36° \sim 12.28°$

| | r | d | ν | n |
|---|---|---|---|---|
| 1 | 93.943 | 3.00 | 31.7 | 1.75692 |
| 2 | 66.968 | 12.00 | 82.6 | 1.49782 |
| 3 | −591.842 | (d3 = variable) | | |
| 4 | 82.317 | 3.50 | 25.5 | 1.80458 |
| 5 | 70.353 | 8.00 | 64.1 | 1.51680 |
| 6 | 488.183 | (d6 = variable) | | |
| 7 | 380.326 | 3.50 | 55.6 | 1.69680 |
| 8 | 157.177 | (d8 = variable) | | |
| 9 | −265.131 | 2.00 | 60.0 | 1.64000 |
| 10 | 57.108 | 5.20 | | |
| 11 | −98.191 | 2.00 | 60.0 | 1.64000 |
| 12 | 38.710 | 5.60 | 26.1 | 1.78470 |
| 13 | 1975.110 | 2.50 | | |
| 14 | −82.183 | 2.50 | 60.0 | 1.64000 |
| 15 | 162.906 | (d15 = variable) | | |
| 16 | 348.643 | 3.80 | 60.3 | 1.51835 |
| 17 | −94.431 | .20 | | |
| 18 | 149.791 | 7.80 | 60.3 | 1.51835 |
| 19 | −44.134 | 2.30 | 27.6 | 1.75520 |
| 20 | −114.778 | (d20 = variable) | | |
| 21 | 33.083 | 7.00 | 82.6 | 1.49782 |
| 22 | 93.501 | .20 | | |
| 23 | 44.457 | 5.00 | 59.7 | 1.53996 |
| 24 | 79.986 | 1.50 | | |
| 25 | 71.472 | 3.00 | 25.5 | 1.80458 |
| 26 | 36.691 | 17.60 | | |
| 27 | 66.042 | 5.50 | 35.6 | 1.62588 |
| 28 | −77.523 | 4.45 | | |
| 29 | −30.215 | 3.00 | 45.4 | 1.79668 |
| 30 | −85.754 | (d30 = variable) | | |

The variable spacings in the seventh embodiment at the infinity distance are as follows:

| F | 82.0000 | 196.0000 |
|---|---|---|
| D0 | ∞ | ∞ |
| d3 | 11.5164 | 11.5164 |
| d6 | 1.5452 | 1.5452 |
| d8 | 3.5748 | 40.2333 |
| d15 | 27.4422 | 4.7004 |
| d20 | 17.5694 | 3.6527 |
| d30 | 54.0151 | 54.0152 |

The variable spacings in the seventh embodiment at the close distance are as follows:

| β | −.0542 | −.1297 |
|---|---|---|
| D0 | 1573.1831 | 1573.1831 |
| d3 | 1.2959 | 1.2959 |
| d6 | 11.7657 | 11.7657 |
| d8 | 3.5748 | 40.2333 |
| d15 | 27.4422 | 4.7004 |
| d20 | 17.5694 | 3.6527 |
| d30 | 54.0151 | 54.0151 |

The condition-corresponding numerical values of the seventh embodiment are as follows:

(1) $f_4/(D_{41} \cdot F_n) = 2.042$
(2) $D_{41}/D_{42} = 3.952$
(3) $q_{43} = -3.110$
(4) $f_4/(f_1 \cdot F_n) = 0.266$
(5) $|f_4/(f_2 \cdot F_n)| = 1.120$
(6) $f_4/(f_3 \cdot F_n) = 0.413$
(7) $D_{12}/f_1 = 0.085$
(8) $f_{11}/f_1 = 1.466$ From each of the above-described embodiments, the present invention achieves a great relative aperture telephoto zoom lens having an excellent imaging performance over the entire magnification change range.

What is claimed is:

1. A great relative aperture telephoto zoom lens of four-unit construction having in succession from the object side:

a first lens unit having positive refractive power;

a second lens unit having negative refractive power;

a third lens unit having positive refractive power; and a fourth lens unit having positive refractive power;

said fourth lens unit having, in succession from the object side, a front group having positive refractive power and a rear group having positive refractive power;

said front group having, in succession from the object side, two positive lens components and a negative lens component;

said rear group having, in succession from the object side, a positive lens component and a negative lens component, and being designed to satisfy the following conditions:

$$1.5 < f_4/(D_{41} \cdot f_n) < 3.0$$

$$3.1 < D_{41}/D_{42} < 4.8$$

$$-3.7 < q_{43} < -1.2$$

where $f_4$: the focal length of the fourth lens unit;

Fn: F number of the entire system;

$D_{41}$: the air gap from the image side lens surface of that positive lens component in the front group in the fourth lens unit which is most adjacent to the image side to the object side lens surface of that lens component in the rear group in the fourth lens unit which is most adjacent to the object side;

$D_{42}$: the air gap from the image side lens surface of that lens component in the rear group in the fourth lens unit which is most adjacent to the object side to the object side lens surface of that lens component in the rear group in the fourth lens unit which is most adjacent to the image side;

$q_{43}$: the shape factor of the negative lens component in the front group in the fourth lens unit, it being to be understood that when the radius of curvature of the object side lens surface is ra and the radius of curvature of the image side lens surface is rb, the shape factor q is defined by $q = (rb+ra)/(rb-ra)$.

2. A great relative aperture telephoto zoom lens according to claim 1, wherein said front group in said fourth lens unit has, in succession from the object side, two positive meniscus lens components and a negative meniscus lens component, and said rear group in said fourth lens unit has, in succession from the object side, a biconvex positive lens component and a negative meniscus lens component.

3. A great relative aperture telephoto zoom lens according to claim 1, satisfying the following conditions:

$$0.26 < f_4/(f_1 \cdot F_n) < 0.30$$

$$1.0 < |f_4/(f_2 \cdot F_n)| < 1.3$$

$$0.34 < f_4/(f_2 \cdot F_n) < 0.42$$

where $f_1$: the focal length of the first lens unit;

$f_2$: the focal length of the second lens unit;
$f_3$: the focal length of the third lens unit;
$f_4$: the focal length of the fourth lens unit;
$F_n$: F number of the entire system.

4. A great relative aperture telephoto zoom lens according to claim 3, satisfying the following conditions:

$$0.01 < D_{12}/f_1 < 0.20$$

$$0.5 < f_{11}/f_1 < 1.6$$

where
- $f_1$: the focal length of the first lens unit;
- $D_{12}$: the air gap between the positive lens group in the first lens unit and the second positive lens group in the first lens unit in the infinity state;
- $f_{11}$: the focal length of the first positive lens group in the first lens unit.

* * * * *